US012190681B2

(12) United States Patent
Leggett et al.

(10) Patent No.: US 12,190,681 B2
(45) Date of Patent: Jan. 7, 2025

(54) GAMING MACHINE AND METHOD WITH A VALUE-BEARING SYMBOL AGGREGATION FEATURE

(71) Applicant: LNW Gaming, Inc., Las Vegas, NV (US)

(72) Inventors: Sarah Leggett, Chicago, IL (US); Jeremy Hornik, Chicago, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 317 days.

(21) Appl. No.: 17/884,615

(22) Filed: Aug. 10, 2022

(65) Prior Publication Data

US 2024/0054860 A1 Feb. 15, 2024

(51) Int. Cl.
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/34* (2013.01)

(58) Field of Classification Search
CPC ............. G07F 17/3211; G07F 17/3213; G07F 17/3262; G07F 17/3265; G07F 17/3267; G07F 17/34
See application file for complete search history.

(56) References Cited

U.S. PATENT DOCUMENTS

| | | | |
|---|---|---|---|
| 3,733,075 | A | 5/1973 | Burnside et al. |
| 5,342,047 | A | 8/1994 | Heidel et al. |
| 5,356,140 | A | 10/1994 | Dabrowski et al. |
| 5,393,061 | A | 2/1995 | Manship et al. |
| 5,704,835 | A | 1/1998 | Dietz |
| 5,833,537 | A | 11/1998 | Barrie |
| 5,951,397 | A | 9/1999 | Dickinson |
| 6,056,642 | A | 5/2000 | Bennett |
| 6,641,477 | B1 | 11/2003 | Dietz |

(Continued)

FOREIGN PATENT DOCUMENTS

| | | | |
|---|---|---|---|
| AU | 2015210489 | A1 | 2/2016 |
| GB | 2097160 | B | 5/1984 |

(Continued)

OTHER PUBLICATIONS

Circa Resort & Casino, "1st Time Playing Double Up Lucky Win," YouTube.com, <https://www.youtube.com/watch?v=mfSebV2cxhA&t=349s>, accessed Jul. 28, 2022.

(Continued)

*Primary Examiner* — Milap Shah

(57) ABSTRACT

Disclosed are gaming methods and a system that utilize a presentation assembly configured to present a series of spins of a plurality of reels arranged in an array, the plurality of reels including value-bearing symbols and a plurality of types of aggregation symbols. When one of the plurality of types of aggregation symbols lands in the array, values borne by one or more value-bearing symbols in the array are aggregated into a value borne by the aggregation symbols according to rules based on its type. At a conclusion of the series of spins, a payout based on the values of the aggregation symbols and any other value-bearing symbols in the array is awarded.

21 Claims, 15 Drawing Sheets

(56) References Cited

U.S. PATENT DOCUMENTS

| | | | |
|---|---|---|---|
| 6,910,962 | B2 | 6/2005 | Marks et al. |
| 7,018,293 | B2 | 3/2006 | Brown et al. |
| 7,029,396 | B2 | 4/2006 | Jaffe et al. |
| 7,503,847 | B2 | 3/2009 | Baerlocher |
| 7,553,231 | B2 | 6/2009 | Rodgers et al. |
| 7,604,538 | B2 | 10/2009 | Pacey |
| 8,083,581 | B2 | 12/2011 | Marks et al. |
| 8,105,151 | B2 | 1/2012 | Caputo et al. |
| 8,162,741 | B2 | 4/2012 | Wadleigh et al. |
| 8,192,275 | B2 | 6/2012 | Aoki et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,608,545 | B2 | 12/2013 | Arora et al. |
| 8,662,986 | B2 | 3/2014 | Rodgers et al. |
| 8,690,660 | B2 | 4/2014 | Saunders et al. |
| 8,790,169 | B2 | 7/2014 | Saunders |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,165,433 | B2 | 10/2015 | Caputo |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,928,691 | B2 | 3/2018 | Olive |
| 10,037,651 | B2 | 7/2018 | You et al. |
| 10,339,761 | B2 | 7/2019 | Olive |
| 10,388,112 | B2 | 8/2019 | You et al. |
| 2002/0119818 | A1 | 8/2002 | Savio et al. |
| 2003/0216165 | A1 | 11/2003 | Singer et al. |
| 2004/0137982 | A1 | 7/2004 | Cuddy et al. |
| 2006/0189369 | A1 | 8/2006 | Taylor |
| 2007/0060248 | A1 | 3/2007 | Rodgers et al. |
| 2007/0129135 | A1 | 6/2007 | Marks et al. |
| 2008/0003278 | A1 | 1/2008 | Mondelo |
| 2008/0004532 | A1 | 1/2008 | Rubey et al. |
| 2008/0032784 | A1 | 2/2008 | Englman |
| 2008/0045298 | A1 | 2/2008 | Yoshizawa |
| 2008/0045320 | A1 | 2/2008 | Kato |
| 2008/0108431 | A1 | 5/2008 | Cuddy et al. |
| 2009/0239634 | A1 | 9/2009 | Nguyen |
| 2009/0291741 | A1 | 11/2009 | Schofield |
| 2010/0075737 | A1 | 3/2010 | Bluemel |
| 2010/0167815 | A1 | 7/2010 | Gagner et al. |
| 2010/0234092 | A1 | 9/2010 | Gomez et al. |
| 2010/0304832 | A1 | 12/2010 | Kup-Ferroth |
| 2012/0122532 | A1 | 5/2012 | Berman et al. |
| 2012/0178517 | A1 | 7/2012 | Montenegro et al. |
| 2014/0014186 | A1 | 1/2014 | Bhattacharya et al. |
| 2014/0141860 | A1 | 5/2014 | Meyer |
| 2014/0179396 | A1 | 6/2014 | Aoki et al. |
| 2014/0274292 | A1 | 9/2014 | Suda |
| 2014/0323198 | A1 | 10/2014 | Tuck |
| 2015/0170462 | A1 | 6/2015 | Berman et al. |
| 2015/0269809 | A1 | 9/2015 | Smith |
| 2015/0287269 | A1 | 10/2015 | Berman |
| 2015/0356833 | A1 | 12/2015 | Aoki et al. |
| 2016/0042597 | A1 | 2/2016 | Olive |
| 2017/0154498 | A1 | 6/2017 | Olive |
| 2018/0268655 | A1 | 9/2018 | Olive |
| 2018/0268659 | A1 | 9/2018 | Chesworth et al. |
| 2019/0102992 | A1* | 4/2019 | You ..................... G07F 17/3213 |
| 2020/0364982 | A1* | 11/2020 | You .......................... G07F 17/34 |
| 2022/0028220 | A1* | 1/2022 | Milosevich ......... G07F 17/3213 |
| 2022/0051519 | A1* | 2/2022 | Chan ................... G07F 17/3213 |
| 2022/0051523 | A1* | 2/2022 | Chan ........................ G06F 7/588 |
| 2022/0051525 | A1* | 2/2022 | Mizzi .................. G07F 17/3244 |
| 2022/0172566 | A1* | 6/2022 | You ..................... G07F 17/3213 |
| 2023/0050242 | A1* | 2/2023 | Bouvier .................. G07F 17/34 |

FOREIGN PATENT DOCUMENTS

| | | |
|---|---|---|
| GB | 2144568 B | 9/1985 |
| GB | 2251112 A | 6/1992 |

OTHER PUBLICATIONS

TheBigPayback, "Big Win! Gold of Tenochtitlan Slot—Very Cool Bonus!," YouTube.com, < https://www.youtube.com/watch?v=Jf6tbzbrFjA&t=245s>, accessed Jul. 28, 2022.

Joshua O'Connell, "Treasure Box Kingdom: IGT Game Offers a Key to Victory," KnowYourSlots.com, < https://www.knowyourslots.com/treasure-box-kingdom-igt-game-offers-a-key-to-victory/ >, accessed Jul. 28, 2022.

* cited by examiner

GAMING MACHINE AND METHOD WITH A VALUE-BEARING SYMBOL AGGREGATION FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods thereon and, more particularly, to new and improved animations in connection with a bonus game feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to embodiment of the present invention, there is provided gaming methods and a system that utilize a presentation assembly configured to present a series of spins of a plurality of reels arranged in an array, the plurality of reels including value-bearing symbols and a plurality of types of aggregation symbols. When one of the plurality of types of aggregation symbols lands in the array, values borne by one or more value-bearing symbols in the array are aggregated into a value borne by the aggregation symbols according to rules based on its type. At a conclusion of the series of spins, a payout based on the values of the aggregation symbols and any other value-bearing symbols in the array is awarded.

Additional aspects of the invention will be apparent to those of ordinary skill in the art in view of the detailed description of various embodiments, which is made with reference to the drawings, a brief description of which is provided below.

Figure 1:
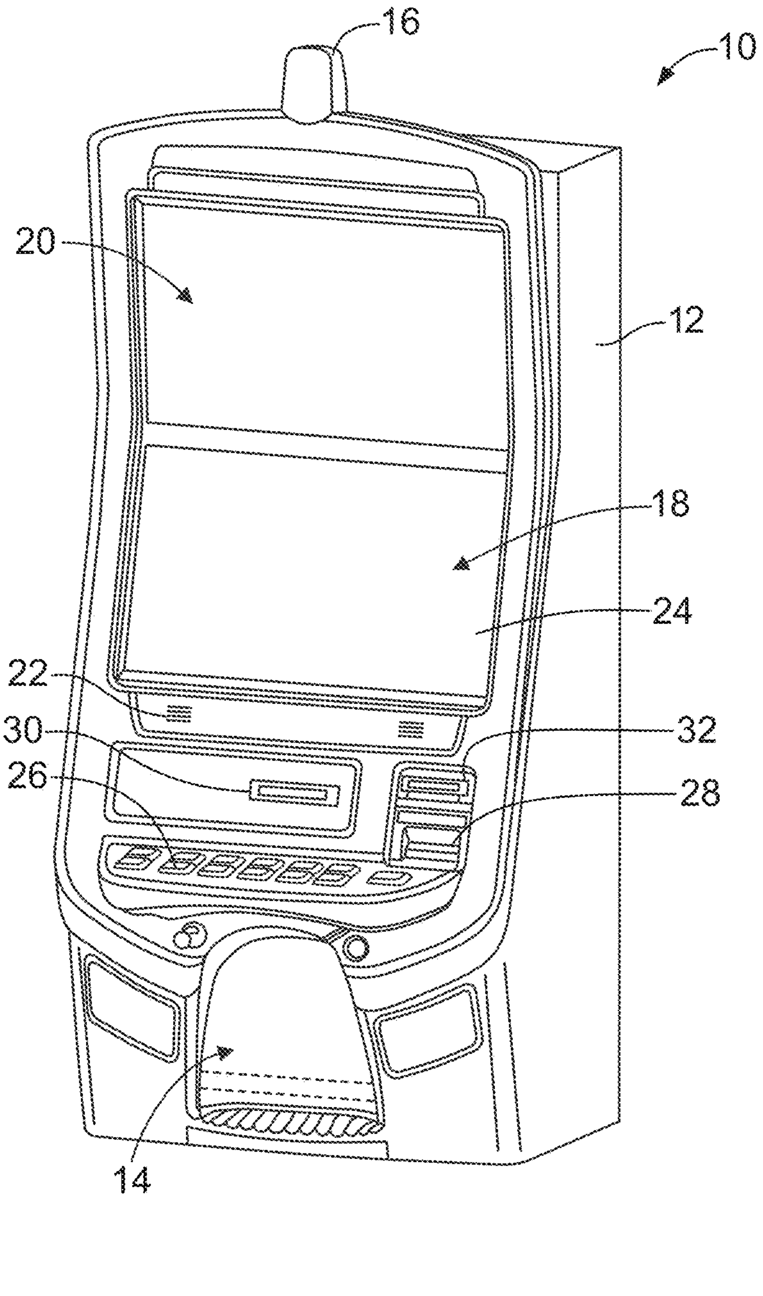
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-8). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-8), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
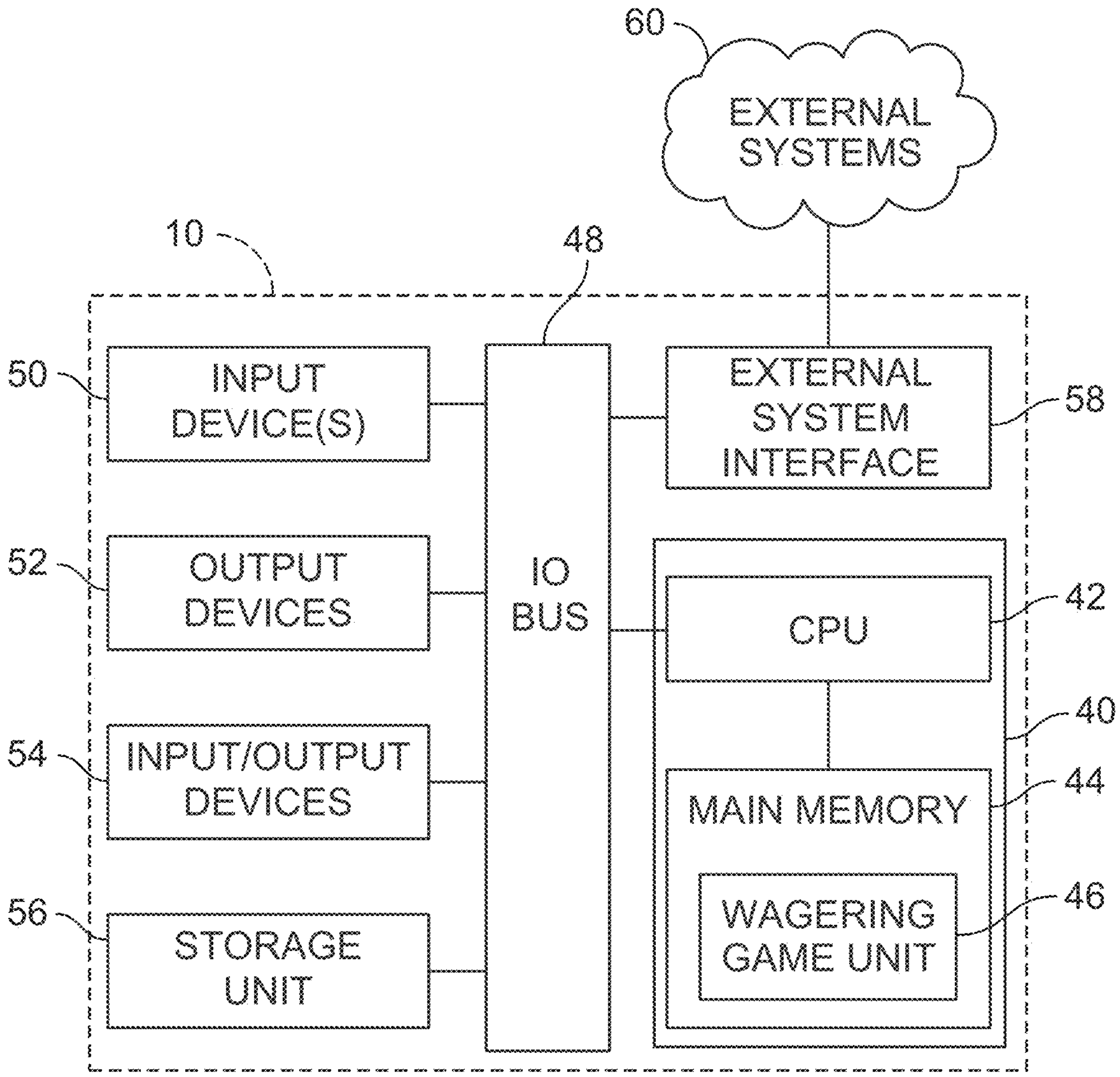
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
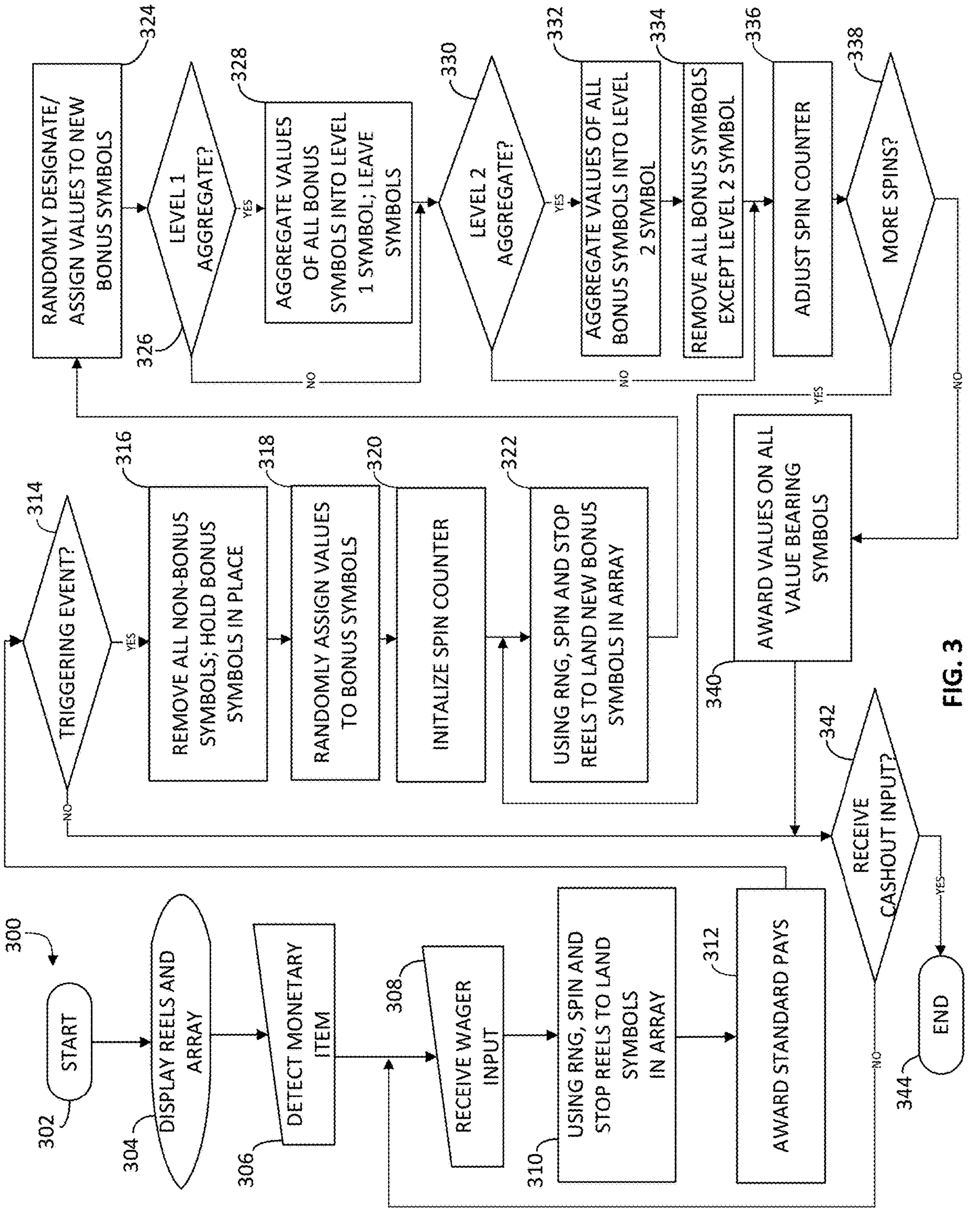
FIG. 3 is a flowchart for a data processing method that corresponds to instructions executed by a controller, according to an embodiment of the present invention.

Referring now to FIG. 3, there is shown a flowchart representing one data processing method 300 corresponding to at least some instructions stored and executed by the game-logic circuitry 40 in FIG. 2 to perform operations according to an embodiment of the present invention. The data processing method 300 is described below in connection with an exemplary representation of a set of game presentations in FIGS. 4-13.

The data processing method commences at step 302. At step 304, the game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

In the examples shown in FIGS. 4-11, the presentation device presents a three-by-six array 230 comprising three rows 222, 224, 226 and six columns 210, 212, 214, 216, 218, and 220. Each column is associated with a respective reel such that the reel populates the three symbol positions in the associated column. The reels bear a plurality of symbols. In one embodiment, the plurality of symbols include standard symbols J, K, Q, A, bonus symbols 206 and a catalyst or trigger symbol 207. Each reel may contain one or more stacks (i.e., clumps) of bonus symbols 206 that appear adjacent to each other along the reel. A stack of bonus symbols 206 may consist of two, three, four, or more adjacent bonus symbols 206. For example, a clump of two bonus symbols 206 are illustrated in the top two rows 222, 224 of the third column 214 and the bottom two rows 224, 226 of column 218 of FIG. 4. Further, adjacent reels may contain one or more "mega" bonus symbols 206 that move as one block as the reels spin. For example, a "mega" value bearing symbol may comprise a two-row high square spanning the second and third columns 212, 214.

Returning to FIG. 3, at step 306, the game-logic circuitry detects, via a value input device, a physical item associated with a monetary value that establishes a credit balance. As shown in FIGS. 4-11, the credit balance may be shown on a credit meter 200 of the gaming machine.

At step 308, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 4-13, the wager may be shown on a bet meter 202.

At step 310, using an RNG, the game-logic circuitry spins and stops the reels to randomly land symbols from the reels in the array in visual association with one or more pay lines (also known as lines, ways, patterns, or arrangements). The reel spin may be animated on a video display by depicting symbol-bearing strips moving vertically across the display and synchronously updating the symbols visible on each strip as the strip moves across the display.

The method 300 illustrated describes a base game and a bonus game triggered during play of the underlying base game. In one or more alternate embodiments, the concepts of aggregating or absorbing value-bearing symbols into an aggregation symbol from within an array may apply to a base game, a bonus game, or both. The bonus game may be a series of free spins utilizing steps 316 through 340 of the method 300 in FIG. 3. The number of free spins may be fixed or variable, but in the illustrated embodiment, when the bonus game commences, a spin counter may be initialized to a reset value, such as five. The spin counter decrements after each free spin but may be reset whenever a second level aggregation value-bearing symbol lands in the array (which will be shown later during the discussion of step 336). The series of free spins continues until the spin counter reaches zero, at which point the bonus game ends with the payment of all values displayed on the value-bearing bonus symbols at step 340 and the method either concludes or returns to the base game depending on whether the player cashes out at step 342 or places another wager at step 308.

At step 312, the game logic circuitry awards standard pays for the standard J, Q, K and A symbols in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. In the example shown in FIG. 4, standard pays may be limited to line pays along three horizontal paylines starting from the leftmost reel: a first payline spanning the middle row 224 of the array 230, a second payline spanning the top row 222 of the array 230, and a third payline spanning the bottom row 226 of the array 230. Any awarded pays are added to the win meter 204 and the game logic circuitry proceeds to step 314.

Figure 4:
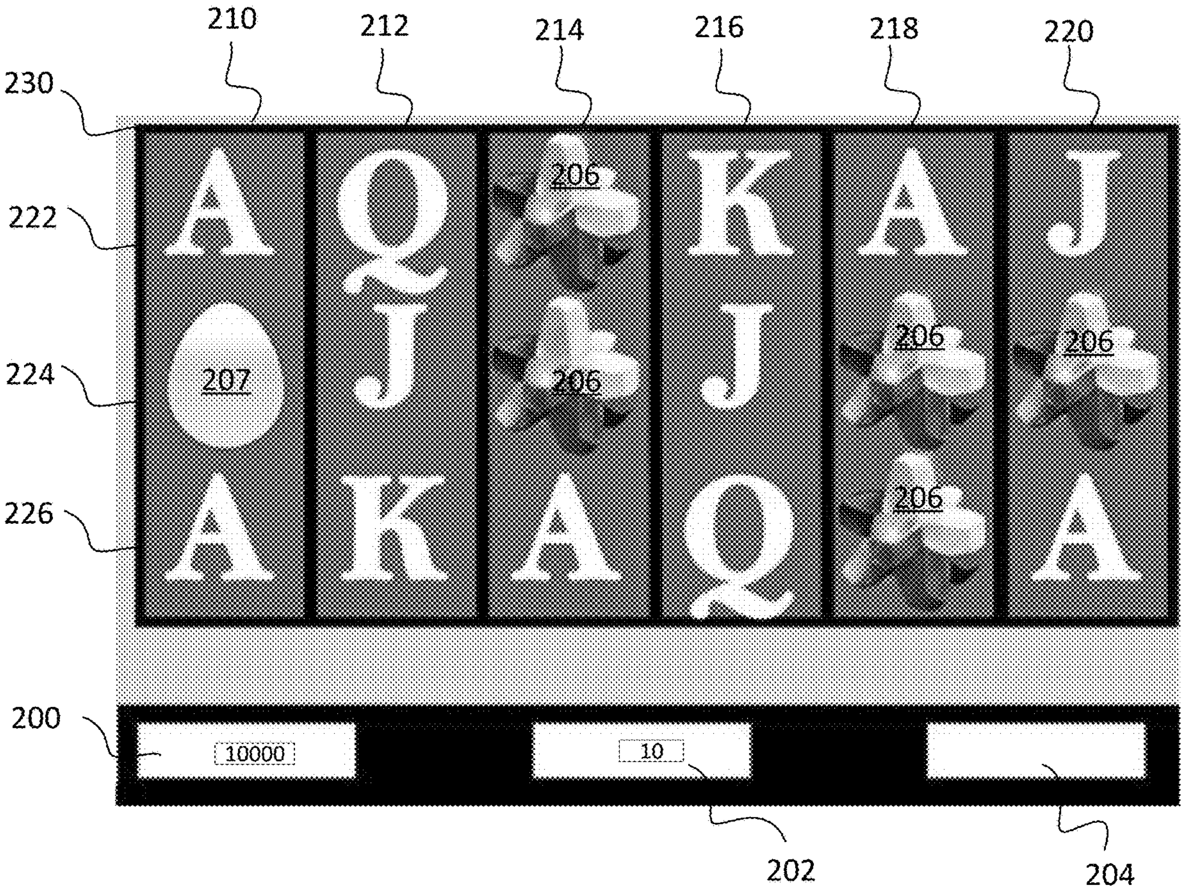
FIGS. 4-11 illustrate examples of game presentations corresponding to various steps presented in FIG. 3.

At step 314, the game-logic circuitry determines whether a bonus triggering event has occurred. In the embodiment shown, the triggering event comprises at least a catalyst symbol 207 landing in the first column 210 of the array and a certain number of bonus symbols 206, for example, five bonus symbols 206, landing in the second through sixth columns 212-220 of the array in the current game cycle. FIG. 4 illustrates such a triggering event, with the appearance of the catalyst symbol 207 in the first column 210 and five bonus symbols 206 comprising two in the third column 214, two in the fourth column 218 and one in the fifth column 220 of the array 230. In one or more alternate embodiments, the game-logic circuitry may employ other means to determine a triggering event for the bonus. For example, without limitation, the triggering event may be based on a random determination using the RNG, when one or more scattered non-bonus symbols appear, after a certain number of base game non-bonus spins have occurred, etc. If no triggering event has occurred, for example, if the array does not contain a catalyst symbol 207 in combination with a sufficient number of bonus symbols 206, the game-logic circuitry immediately proceeds from step 314 to step 342 to determine whether the player wishes to play another base game cycle, as described above.

Figure 5:
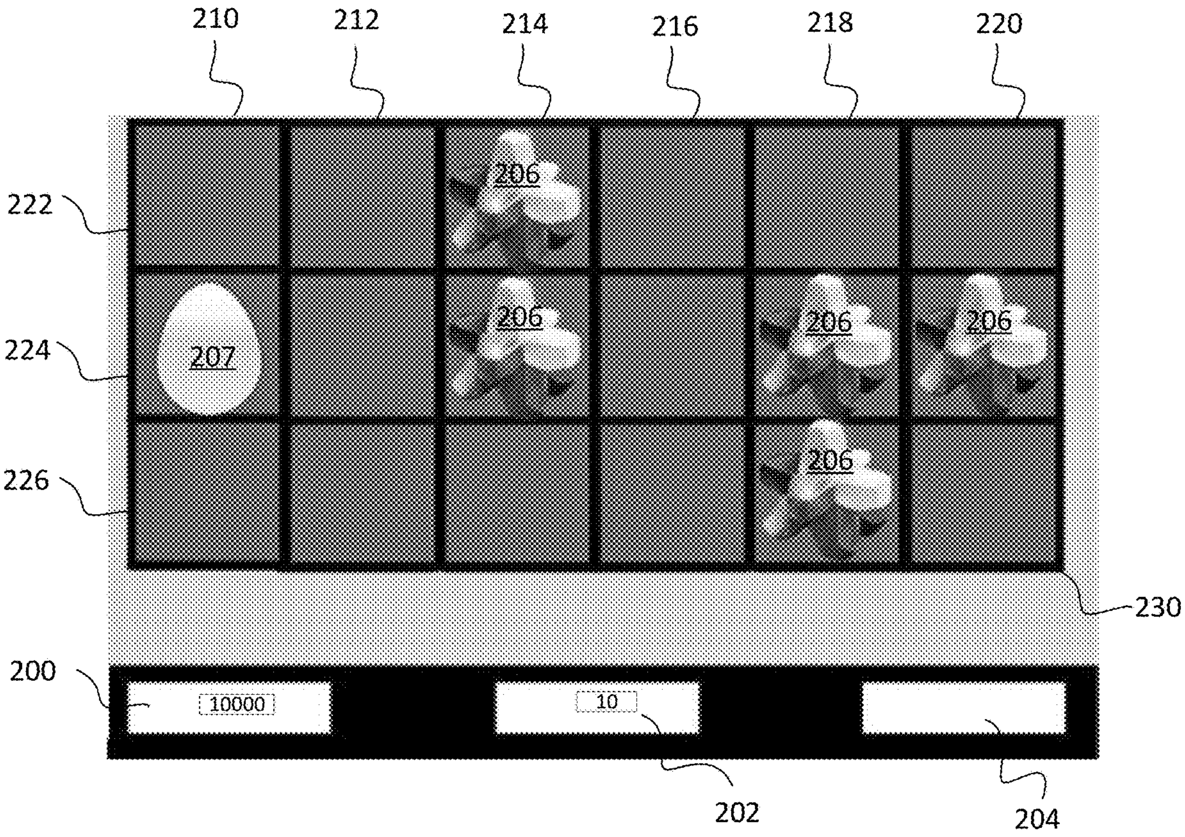

If, as shown in FIG. 4, a triggering event has occurred at step 314, the game-logic circuitry transitions to the presentation of a bonus game via the presentation assembly. FIG. 5, in accordance with one or more embodiments, illustrates this transition. As described above, a catalyst symbol 207 and five or more bonus symbols 206 have triggered the bonus game (step 314). At step 316, as also shown in FIG. 5, the triggering bonus symbols 206 and the catalyst symbol 207 are held in place in the array and all standard J, Q, K and A symbols are removed from the reels and from the array.

Figure 6:
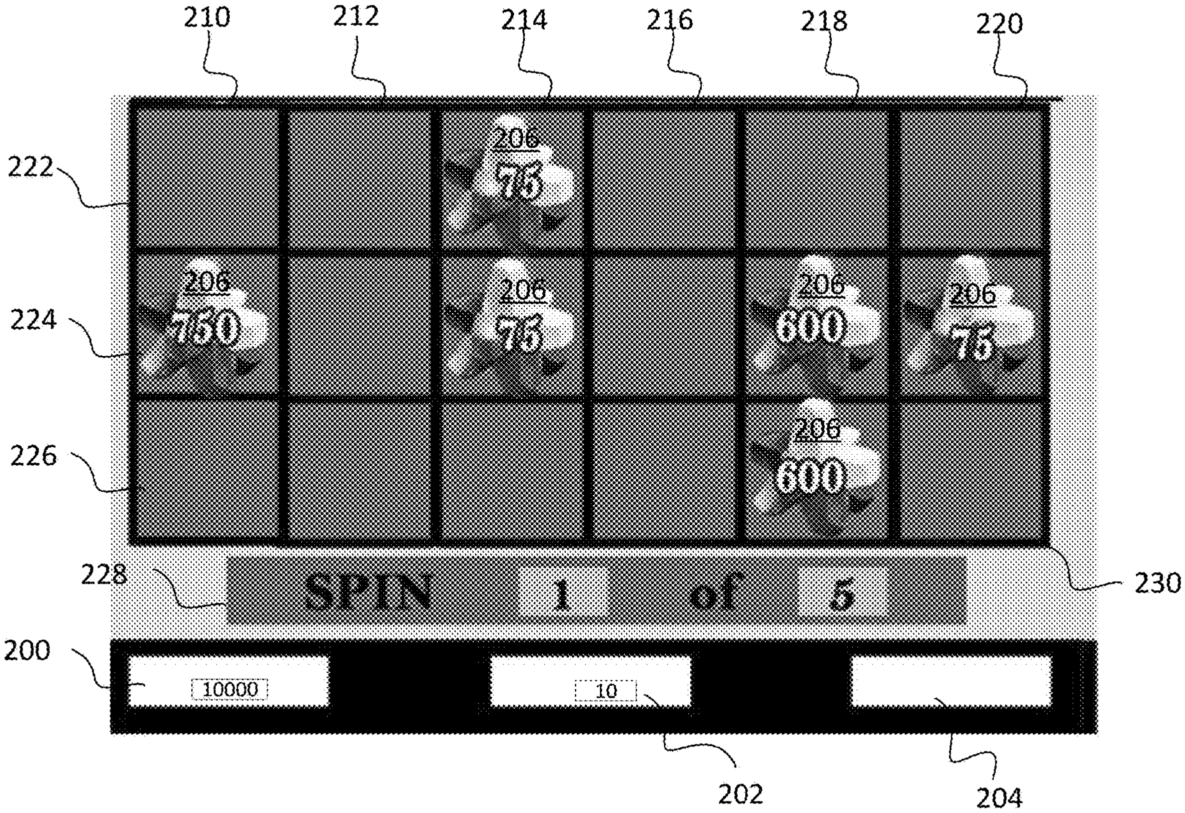

At step 318, each bonus symbol 206 in the array 230 is designated a value-bearing symbol. For example, in the embodiment illustrated in FIG. 6, each bonus symbol 206 is converted to a value-bearing symbol with a credit or currency value indicated on the symbol itself. In addition, the catalyst symbol 207 is converted to a bonus symbol 206 and assigned a randomly-selected prize value. The value on a particular bonus symbol 206 may be fixed or variable (e.g., random) from one game cycle to the next. Although the example of FIG. 6 shows the same prize value assignment to each of the bonus symbols 206 in a given column, different value-bearing bonus symbols 206 on the reels may have different values. In one or more embodiments, a bonus symbol 206 may be associated with a value determined separately. For example, rather than a specific amount, a GRAND, MAJOR, MINOR, or MINI progressive label may be indicated on a value-bearing bonus symbol 206. At step 320, a bonus spin counter 228 (FIG. 6) is initialized, for example, to spin 1 of 5 spins.

At step 322, again using the RNG, the game-logic circuitry spins and stops the reels to randomly land additional bonus symbols 206 from the reels in the array 230. As above, the reel spin may be animated on a video display by depicting symbol-bearing strips moving vertically across the display and synchronously updating the symbols visible on each strip as the strip moves across the display. At step 324, any newly-landed bonus symbol 206 is also assigned a randomly selected designation as a value-bearing symbol, as described in the discussion of step 318, or as one of two levels of aggregation symbol. First-level and second-level aggregation symbols will be described further below.

Figure 7:
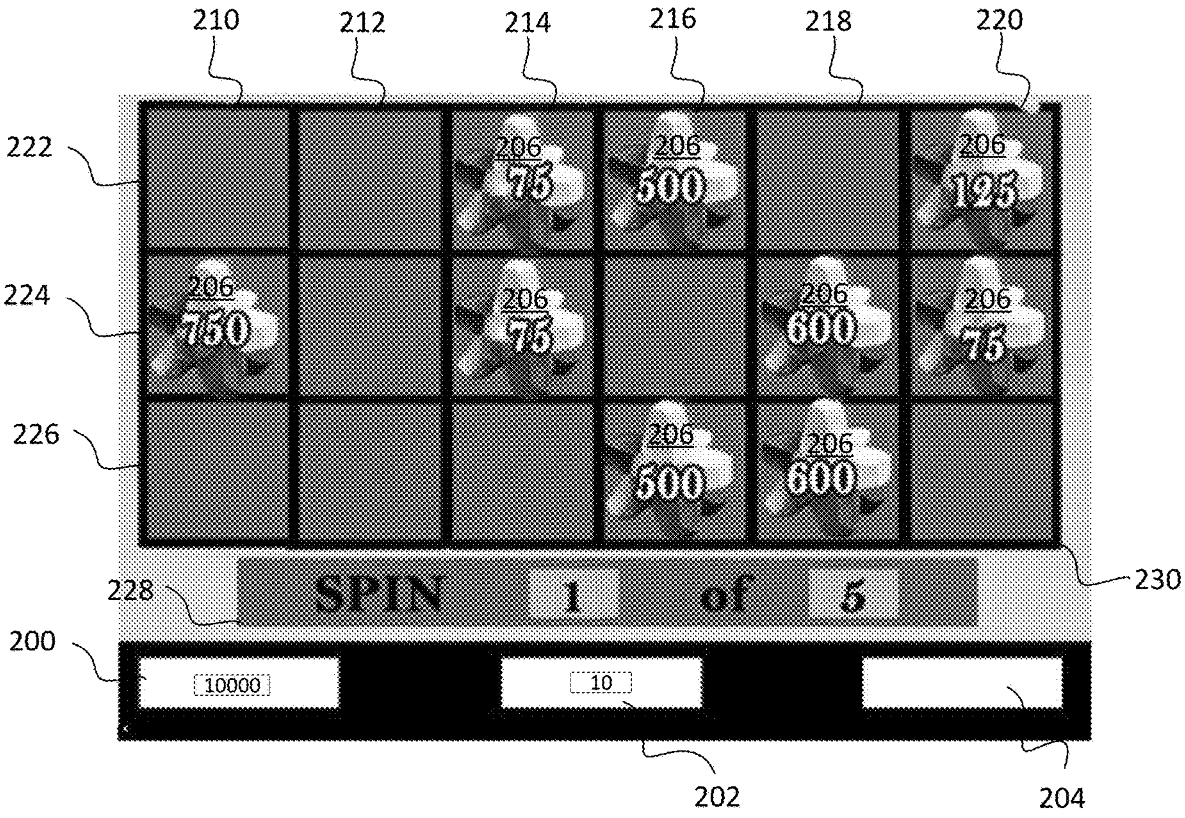

As illustrated in FIG. 7, two new bonus symbols 206 landed in the fourth column 216 and were assigned a prize value of 500 each. A new bonus symbol 206 landed in the top row 222 of the fifth column 220 and was randomly assigned a prize value of 125.

At step 326, the game-logic circuitry determines whether any of the bonus symbols 206 in the array bears a first-level aggregation symbol designation. For example, a bonus symbol 206 might display the label "Award All." Since none of the value-bearing symbols 206 displayed in the array of FIG. 7 carry such a designation, the method 300 proceeds to step 330.

At step 326, the game-logic circuitry determines whether any of the bonus symbols 206 in the array bears a second-level aggregation symbol designation. For example, a value-bearing symbol 206 might display a "Gold Award All." Since none of the value-bearing symbols 206 displayed in the array of FIG. 7 carry such a designation, the method 300 proceeds to step 336.

At step 336, the game logic-circuitry adjusts the bonus spin counter. In most cases, the bonus spin counter is incremented. For example, it might increment to spin 2 of 5. In some cases, as will be described below, the spin counter may receive additional available spins, for example, it might increment to spin 2 of 8 if three additional spins are awarded.

At step 338, the game logic circuitry determines whether there are any additional bonus spins to be performed. If so, the method returns to step 322.

Figure 8:
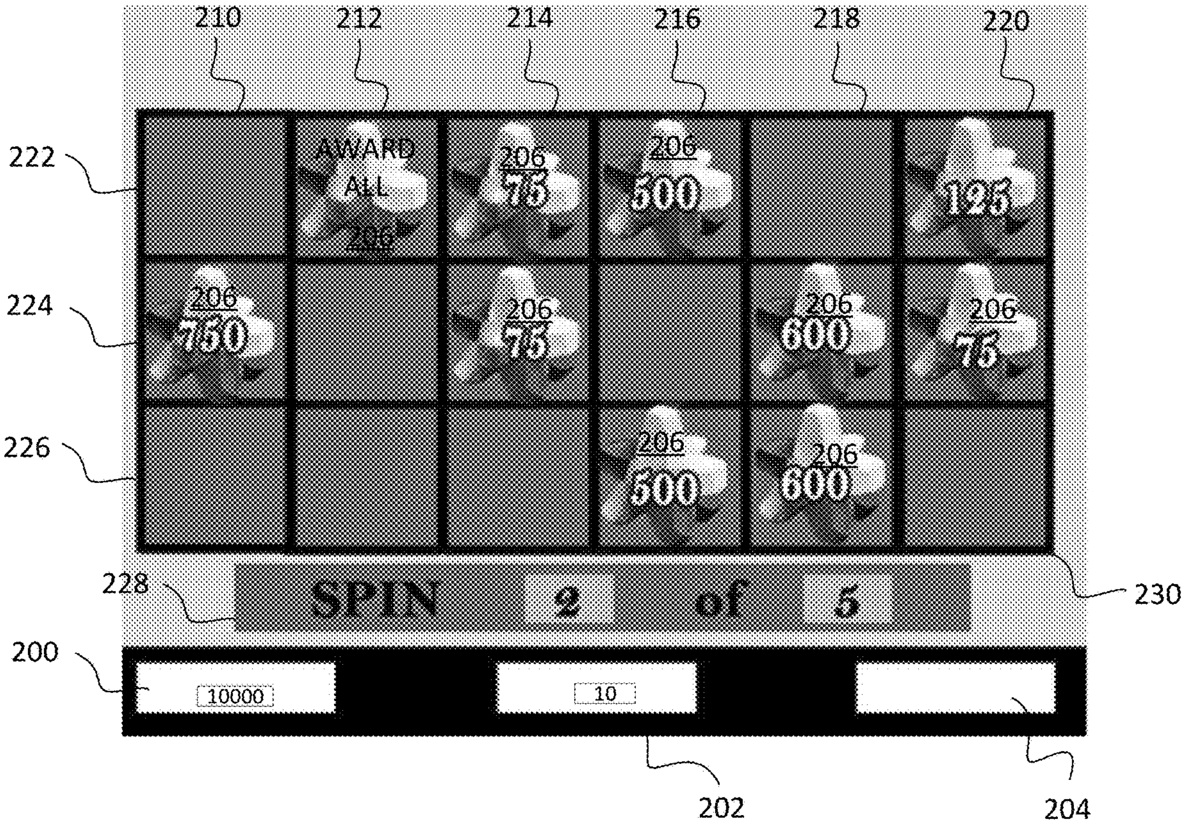

The illustration of FIG. 8 shows an example of the results of a second bonus spin. The bonus spin counter 228 has been incremented to spin 2 of 5 (Step 336) and a new bonus symbol 206 has landed in the second column 212 of the array 230. This new bonus symbol carries an "Award All" label, which designates it as a first-level aggregation symbol.

Figure 9:
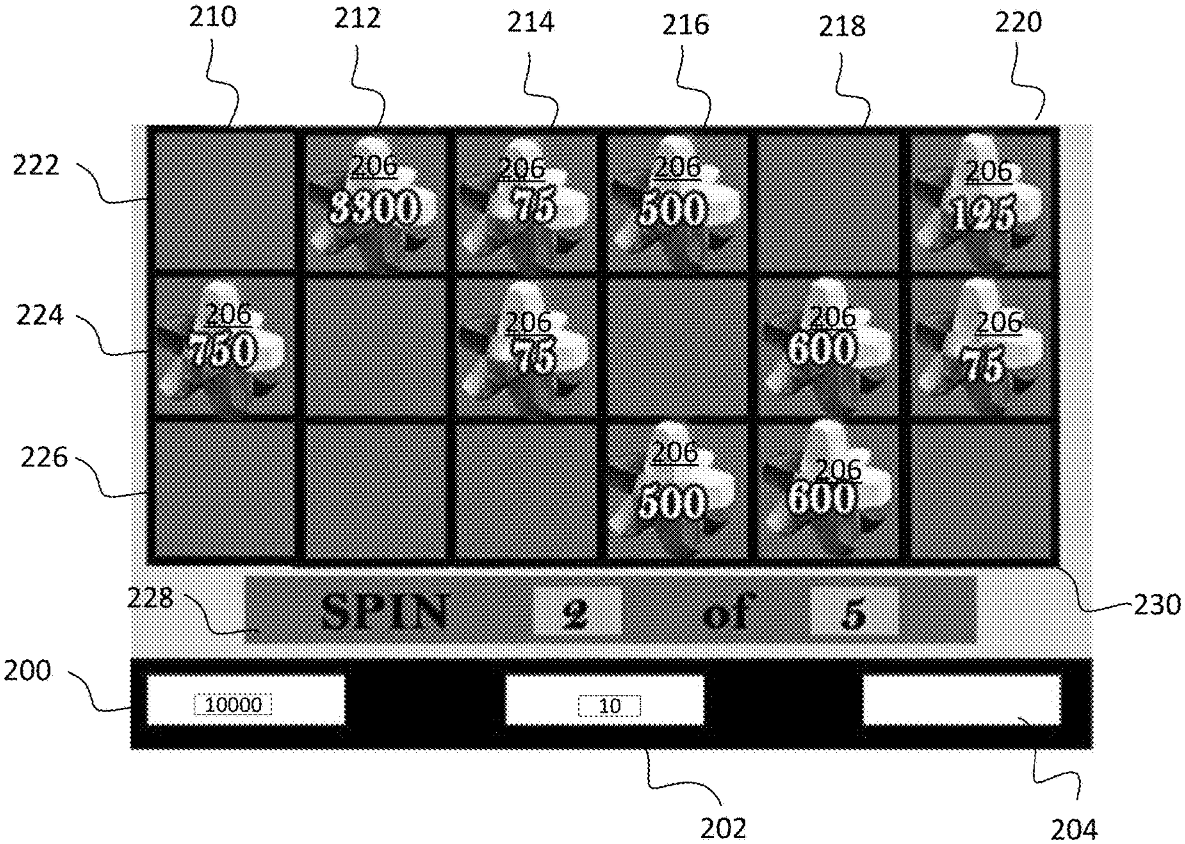

FIG. 9 illustrates the results of additional steps of method 300 performed during the second bonus spin. In this case, at step 324, the value assigned to the newly landed bonus symbol 206 in the second column 212 was designated as a first-level aggregation symbol, for example, with an "Award All" label. As a result of this designation being detected at step 326, according to rules for first-level aggregation symbols, the prize value of the newly landed bonus symbol 206 in the second column 212 was modified to reflect the sum of all value-bearing bonus symbols 206 present in array 230 at that time. Thus, the prize value shown on the first-level aggregation symbol 206 in the second column 212 of FIG. 9 is 3300. (750+75+75+500+500+600+600+125+75=3300). Once the values of the other value-bearing symbols have been aggregated into the first-level aggregation symbol, it returns to being a value-bearing symbol bearing the aggregated value.

In this example of a second bonus spin, since no second-level aggregation symbol designation was assigned to any newly landed bonus symbols 206 at step 324, the evaluation at step 330 causes the game logic circuitry to proceed to step 336, where it increments the spin counter to spin 3 of 5 (not shown) and checks for remaining spins at step 338 before proceeding to step 322 for a third bonus spin following the steps of 322-338 as already described.

For the sake of brevity, it will be assumed that the above-mentioned third bonus spin and a fourth bonus spin resulted in no newly landed bonus symbols 206 in the array 230.

Figure 10:
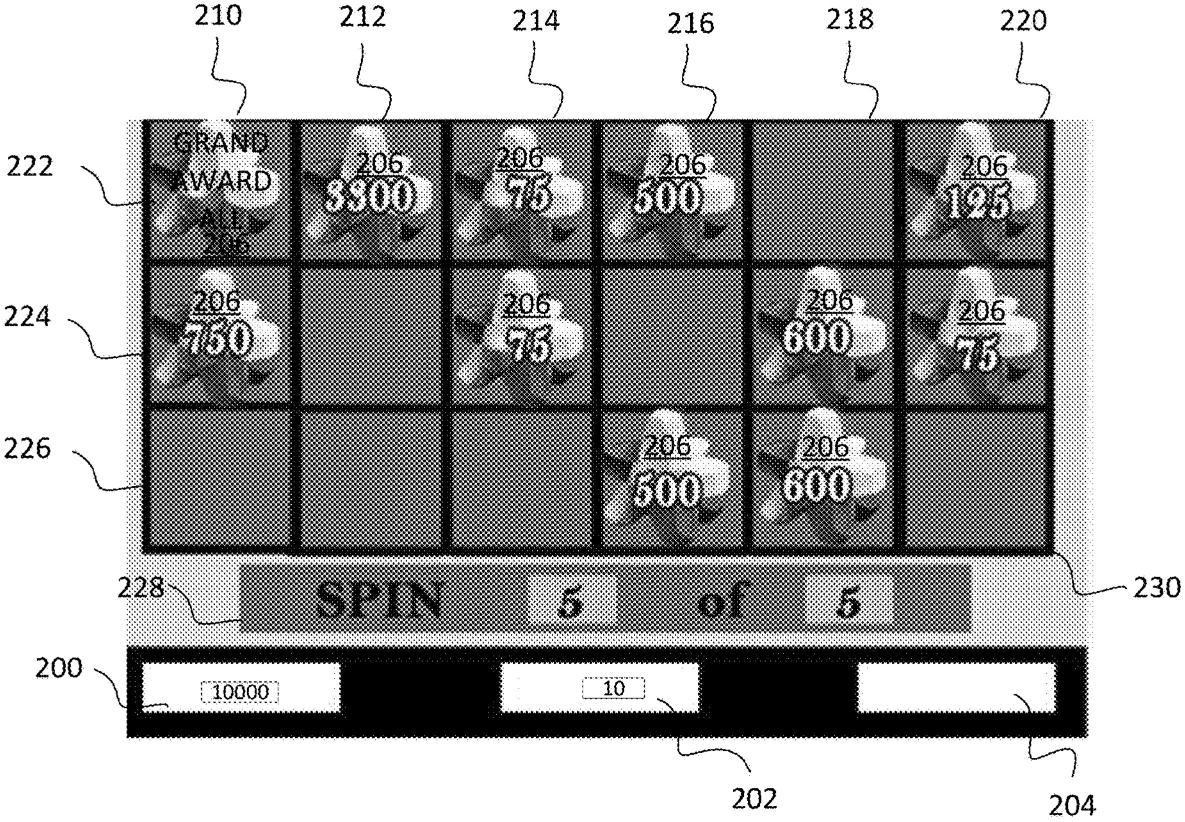

FIG. 10 illustrates an example of the start of a fifth bonus spin, picking up the method 300 at the conclusion of step 322. The spin counter 228 shows that the current bonus spin is spin 5 of 5 available bonus spins. A bonus symbol 206 is shown newly landed in the top row 222 of the first column 210 of the array 230. Briefly following the above descriptions, in this scenario, a second-level aggregation symbol designation "GRAND AWARD ALL" was assigned to the newly landed bonus symbol 206 at step 324 Since there is only a single newly landed bonus symbol 206 and it does not carry first-level aggregation prize designation ("AWARD ALL"), the game logic circuitry takes no action at step 328, but, rather, upon detecting the second level aggregation prize designation at step 330, performs the actions of step 332.

At step 332, as in step 328, the prize value of the newly landed bonus symbol 206 at the top of the first column 210 is modified to reflect the sum of all value-bearing bonus symbols 206 present in array 230 at that time according to rules for second level aggregation symbols. As illustrated in the example of FIG. 10, which reflects the results of step 332, the prize value shown on the bonus symbol 206 at the top of the first column 210 of FIG. 10 is 6600. (750+3300+75+75+500+500+600+600+125+75=6600). Once the values of the other value-bearing symbols have been aggregated into the second-level aggregation symbol, it returns to being a value-bearing symbol bearing the newly aggregated value. In addition to this aggregation, all other value-bearing symbols in the array 330 at that time are removed from the array. This gives the player an opportunity to collect even more bonus symbols 206 with potentially higher prize amounts than those previously assigned to bonus symbols 206 in the array 230.

Figure 11:
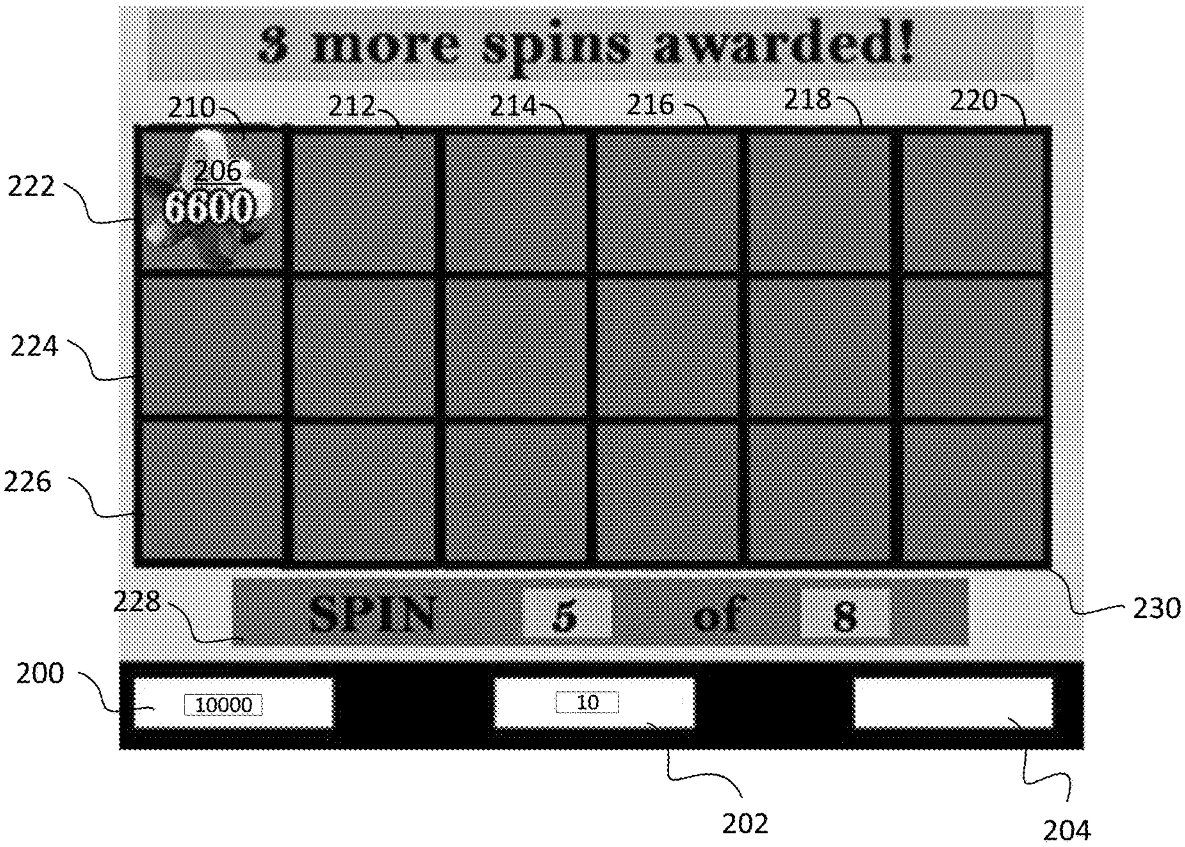

At step 336, according to the rules for second-level aggregation symbols, the bonus spin counter 228 is adjusted, as shown in FIG. 11, to receive an extra number of available free spins, for example, three extra spins for a total of eight available spins.

The bonus game then proceeds through its remaining steps and spins as described above until the bonus spin counter is exhausted, for example, by being incremented to 8 of 8 spins with no additional spins awarded. When this is detected at step 338, the game-logic circuitry awards all of the amounts displayed on the value-bearing bonus symbols 206 in the array 230 at step 340. The bonus game has then reached a conclusion and the player may cashout at step 342, concluding the method 300 at step 344, or place another base game wager at step 308.

Figure 12:
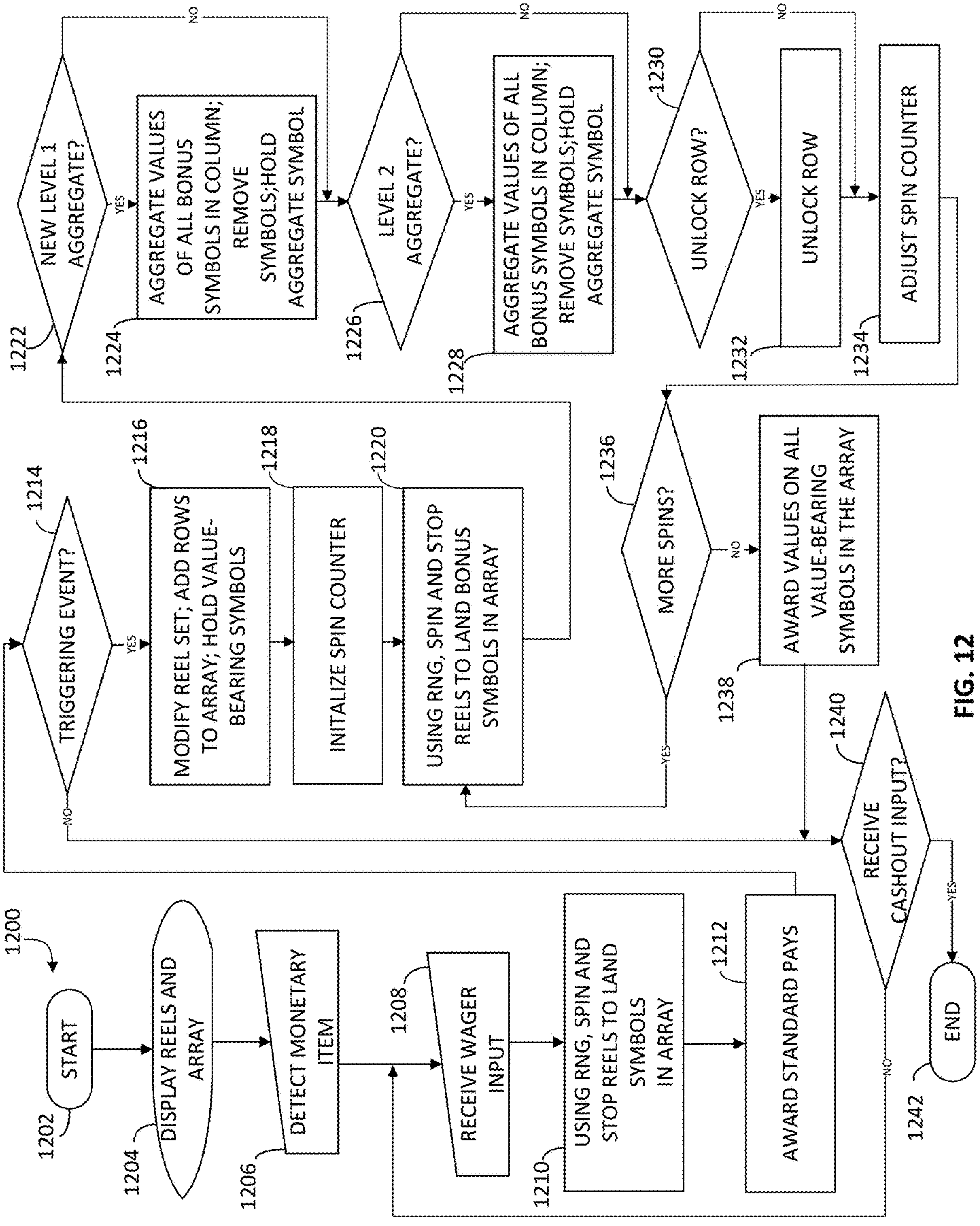
FIG. 12 is a flowchart for a data processing method that corresponds to instructions executed by a controller, according to another embodiment of the present invention.

Referring now to FIG. 12, in accordance with other embodiments, there is shown a flowchart representing one data processing method 1200 corresponding to at least some instructions stored and executed by the game-logic circuitry 40 in FIG. 2 to perform operations according to an embodiment of the present invention. The data processing method 1200 is described below in connection with an exemplary representation of a set of game presentations in FIGS. 13-15.

The data processing method commences at step 1202. At step 1204, the game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In the described embodiment, the reels are associated with respective individual symbol positions of the array such that each reel populates only its respective symbol position.

Figure 13:
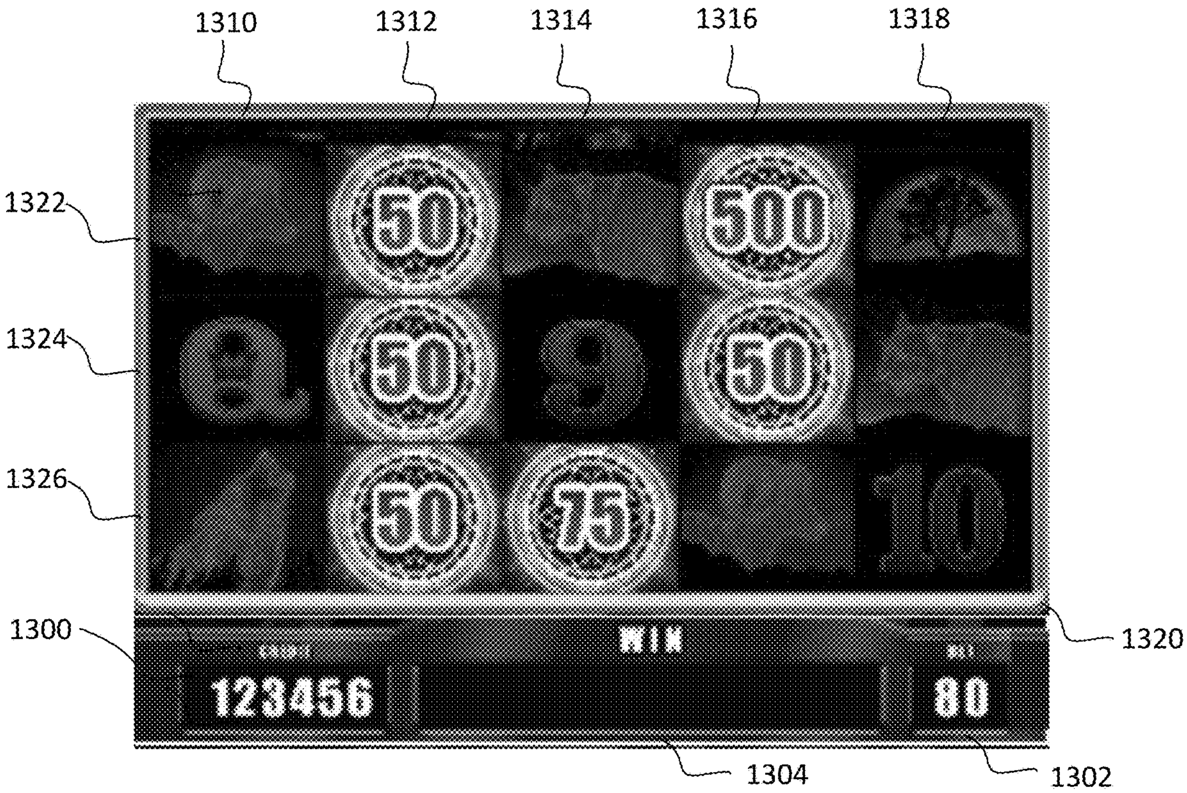
FIGS. 13-15 illustrate examples of game presentations corresponding to various steps presented in FIG. 12.

In the example shown in FIG. 13, the presentation device presents a three-by-five array 1320 comprising three rows 1322, 1324, 1326 and five columns 1310, 1312, 1314, 1316, and 1318. The reels bear a plurality of symbols. In one embodiment, the plurality of symbols includes standard symbols and value-bearing bonus symbols. For the sake of clarity, the standard symbols are shown dimmed in FIG. 13 such that the value-bearing bonus symbols are emphasized. In one or more embodiments, a value-bearing bonus symbol may be associated with a value determined separately. For example, rather than a specific amount, a GRAND, MAJOR, MINOR, or MINI progressive label may be indicated on a value-bearing bonus symbol. When a value-bearing bonus symbol lands in the array 1320, it remains locked in place throughout all of the spins of the bonus game unless aggregated into an aggregation symbol, described below. When the bonus game ends, the values on any value-bearing bonus symbols in the array 1320, including aggregation symbols, are summed and awarded to the player.

Returning to FIG. 12, at step 1206, the game-logic circuitry detects, via a value input device, a physical item associated with a monetary value that establishes a credit balance. As shown in FIG. 13, the credit balance may be shown on a credit meter 1300 of the gaming machine.

At step 1208, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIG. 13, the wager may be shown on a bet meter 1302.

At step 1210, using an RNG, the game-logic circuitry spins and stops the reels to randomly land symbols from the reels in the array in visual association with one or more pay lines (also known as lines, ways, patterns, or arrangements). The reel spin may be animated on a video display by depicting symbol-bearing strips moving vertically within each cell of the array 1320.

The method 1200 illustrated describes a base game and a bonus game triggered during play of the underlying base game. As with the example game described with reference to FIGS. 3-11, the concepts of aggregating the values displayed by value-bearing symbols within an array as disclosed herein may apply to a base game, a bonus game, or both. The bonus game may be a series of free spins utilizing steps 1216 through 1236 of the method 1200 in FIG. 12. The number of free spins may be fixed or variable, but in the illustrated embodiment, when the bonus game commences, a spin counter may be initialized to a reset value, such as six. The spin counter decrements after each free spin, but may be modified whenever a certain aggregation symbol lands in the array, described below during the discussion of step 1234. The series of free spins continues until the spin counter reaches a concluding value, typically zero, at which point the bonus game ends with the payment of all values displayed on any value-bearing bonus symbols currently in the array 1320 at step 1238. The method 1200 then either concludes at step 1242 or returns to the base game depending on whether the player cashes out at step 1240 or places another wager at step 1208.

At step 1212, the game logic circuitry awards standard pays for the standard base game symbols in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. In the example shown in FIG. 13, standard pays may be limited to line pays along three horizontal paylines starting from the leftmost reel: a first payline spanning the middle row 1324 of the array 1330, a second payline spanning the top row 1322 of the array 1330, and a third payline spanning the bottom row 1326 of the array 1330. Any awarded pays are added to the win meter 1304 and the game logic circuitry proceeds to step 1214.

At step 1214, the game-logic circuitry determines whether a bonus triggering event has occurred. In the embodiment shown, the triggering event comprises at least a certain number of value-bearing bonus symbols, for example, six bonus symbols, landing in the array 1320 in the current game cycle. FIG. 13 illustrates such a triggering event, with the appearance of three value-bearing bonus symbols in the second column 1312, one in the third column 1314, and two in the fourth column 1316. In one or more alternate embodiments, the game-logic circuitry may employ other means to determine a triggering event for the bonus. For example, without limitation, the triggering event may be based on a random determination using the RNG, when one or more scattered non-bonus symbols appear, after a certain number of base game non-bonus spins have occurred, etc. If no triggering event has occurred, for example, if the array does not contain a sufficient number of scattered value-bearing bonus symbol, the game-logic circuitry immediately proceeds to step 1240 to determine whether the player wishes to play another game cycle, as described above.

Figure 14:
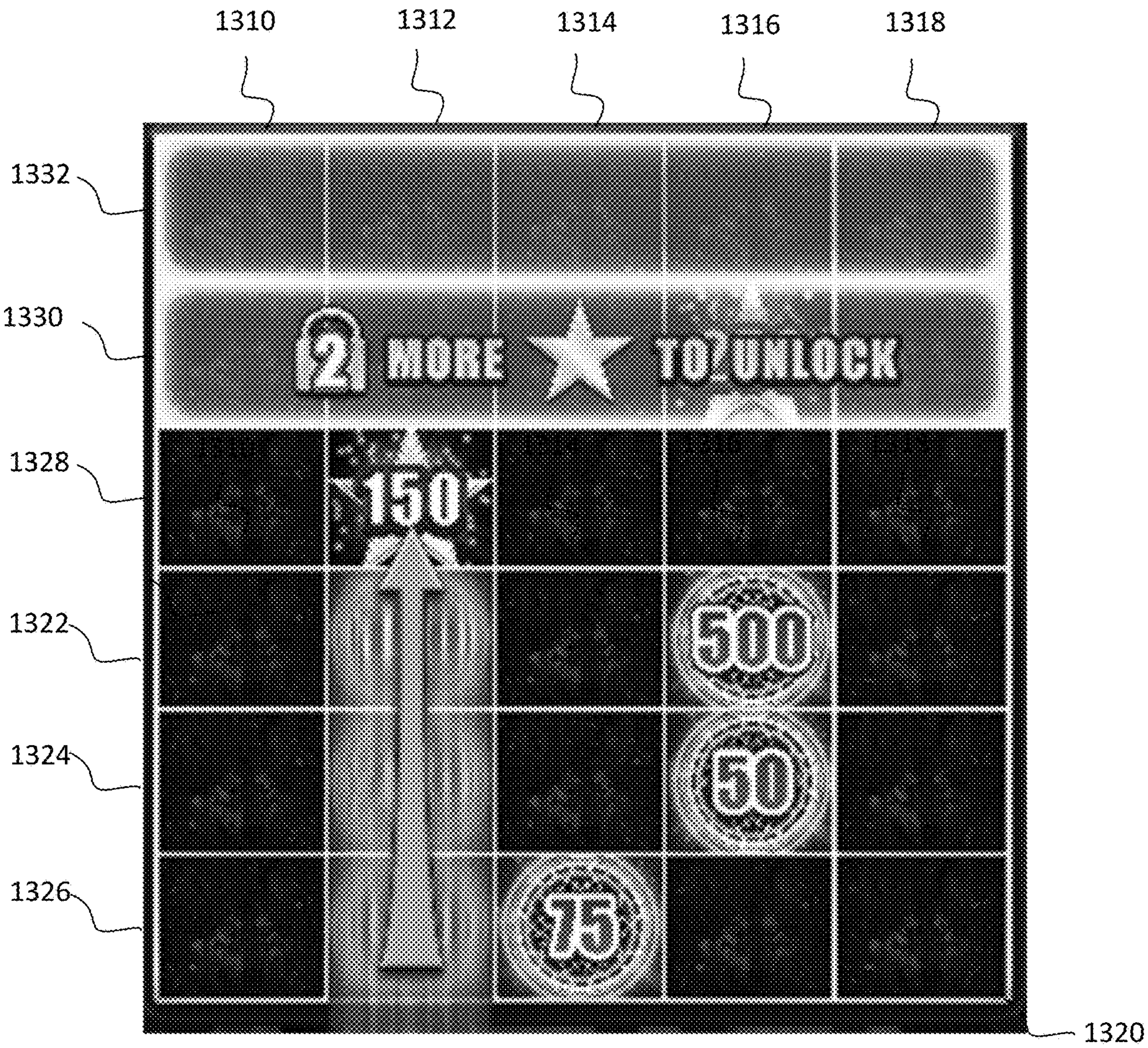

If, however, a triggering event has occurred at step 1214, the game-logic circuitry transitions to the presentation of a bonus game via the presentation assembly. FIG. 14, in accordance with one or more embodiments, illustrates one example of a spin of this bonus game. In the example of FIG. 14, as a result of triggering the bonus game, the base game symbols have been removed from the reels so that the reels only contain value-bearing bonus symbols and blanks. Three additional rows 1328, 1330, 1332 have been added to the array 1320, positioned above the top row 1322 of the base game. The reels associated with the additional rows 1328, 1330, 1332 contain special star-shaped aggregation symbols. When the bonus game was triggered, the top two additional rows 1330, 1332 were locked; that is, any symbols landing in their positions in the array 1320 are ignored. Unlocking the additional rows 1330, 1332 will be described further in the discussion of step 1232.

At step 1220, again using the RNG, the game-logic circuitry spins and stops the reels to randomly land value-bearing bonus symbols from the reels in the array 1320. As illustrated by FIG. 14, a star-shaped aggregation symbol landed in the second column 1312 of the first additional row 1328. Because it is in one of the first additional row 1328 or the second additional row 1330, this aggregation symbol is considered a first-level aggregation symbol, which is detected by the game-logic circuitry at step 1222. If there are no newly landed first-level aggregation symbols, the game-logic circuitry proceeds directly to step 1226.

At step 1224, according to rules for first-level aggregation symbols, the values borne by all value-bearing symbols in the column beneath any newly landed first-level aggregation symbol are summed and added to any value (currently none) already borne by their respective first-level aggregation symbol. Thus, in the example of FIG. 13, the three value-bearing bonus symbols in the second column 1312 each bore a value of 50 credits. In FIG. 14, these values are shown summed and a value of 150 (50+50+50) is placed on the newly landed first-level aggregation symbol in the second column 1312. In addition, the original value-bearing bonus symbols in rows 1322, 1324, 1326 of the second column 1312 are "absorbed" by the first-level aggregation symbol and removed from the array. This gives the player an opportunity to collect even more value-bearing symbols in the vacated cells during subsequent bonus spins. As represented by the arrows in FIG. 13, this absorption may be animated on the display. According to rules for first-level aggregation symbols in this embodiment, though it remains locked in place for all subsequent spins of the bonus game, a first-level aggregation symbol only aggregates the values landing below it when it first lands. Since it can no longer aggregate future value-bearing symbols that land below it, in some embodiments, it may be converted to and displayed as a regular coin-shaped value-bearing symbol that may later be aggregated into an aggregation symbol landing in a row above it.

At step 1226, the game-logic circuitry determines whether any new second-level aggregation symbols have landed in the array. In this embodiment, a second-level aggregation symbol is a star-shaped aggregation symbol that has landed in the third additional row 1332 when that row has been unlocked. Since the third additional row 1332 is locked in FIG. 14, the method 300 proceeds to step 1230.

At step 1230, the game-logic circuitry determines whether any of the additional rows 1330, 1332 should be unlocked. Unlocking the second additional row 1330 requires the landing of three first-level aggregation symbols in the first additional row 1328. Since aggregation symbols lock in place once they land, the accumulation of three aggregation symbols in a particular row may occur over the course of multiple spins of the bonus game. Similarly, once the second additional row 1330 has been unlocked, unlocking the third additional row 1332 requires the landing of three first-level aggregation symbols in the second additional row 1330. If the required number of first-level aggregation symbols have not yet accumulated in the highest unlocked additional row 1328, 1330, the game logic circuitry proceeds to step 1234. Otherwise, it unlocks the next additional row 1330, 1332 at step 1232. In the example of FIG. 14, since one first-level aggregation symbol has landed in the first additional row 1328, a message indicates that two additional star-shaped first-level aggregation symbols are required to unlock the second additional row 1330.

At step 1234, the game logic-circuitry adjusts the bonus spin counter. In most cases, the bonus spin counter is decremented, for example, from the original six spins to five remaining spins. However, because a newly landed first-level aggregation symbol landed in the array 1320, an extra bonus spin is awarded based on rules associated with first-level aggregation symbols. Thus, in the example of FIG. 14, the spin counter would simply remain at 6 remaining spins.

At step 1236, the game logic circuitry determines whether there are any additional bonus spins to be performed. If so, the method returns to step 1220.

Figure 15:
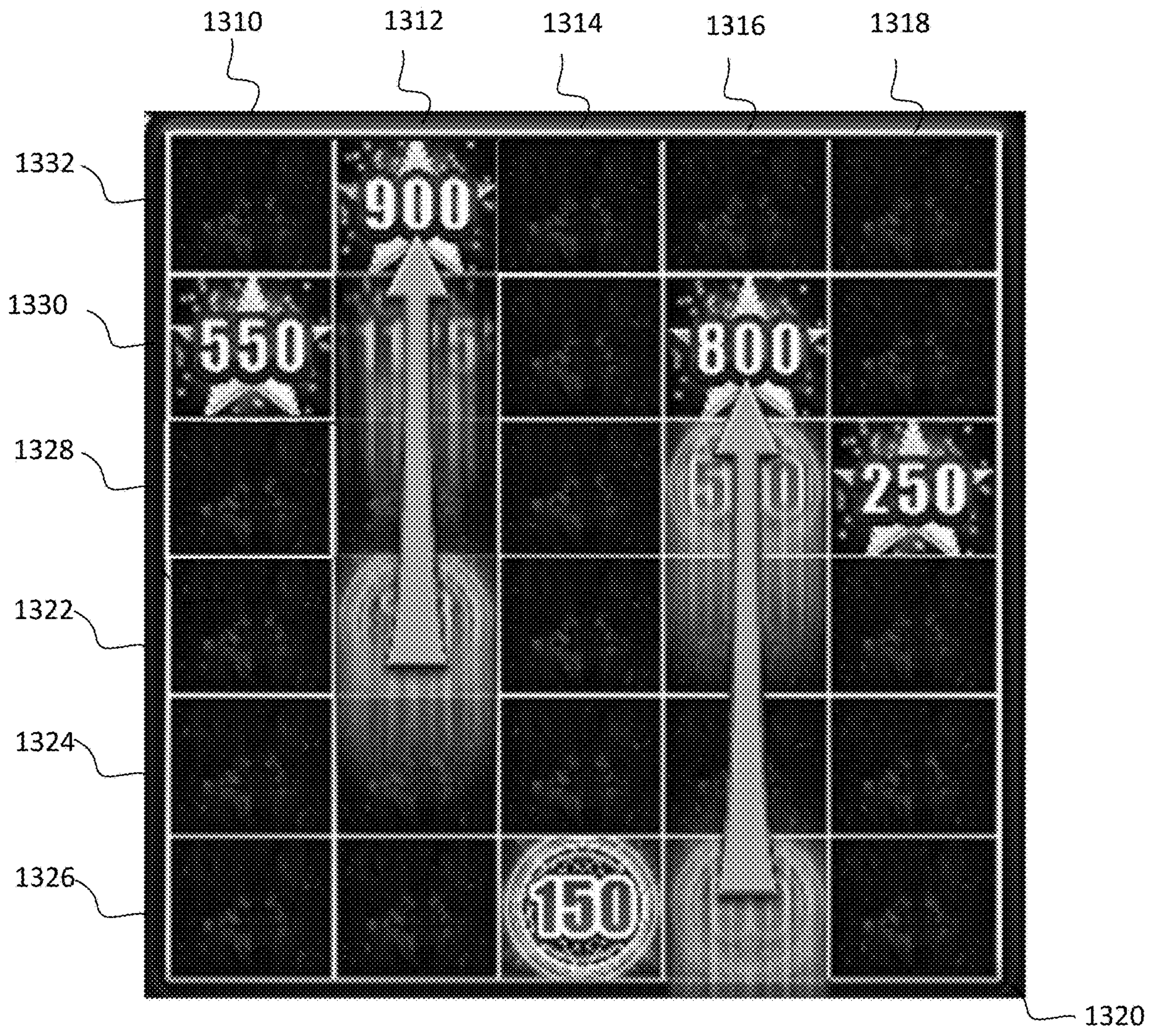

The illustration of FIG. 15 shows an example of the results of a later bonus spin. At this point in the bonus game, both the second additional row 1330 and the third additional row 1332 have been unlocked. Picking up the method at step 1222, a newly landed first-level aggregation symbol is detected in the fourth column 1316 and step 1224 is performed as described above. The aggregation symbol in the second column 1312 landed in the top additional row 1332 and is, thus, designated a second-level aggregation symbol. This second-level aggregation symbol is detected at step 1226. According to rules for second level aggregation symbols, a second-level aggregation symbol differs from a first-level aggregation symbol in that, instead of only aggregating any value-bearing symbols in the same column during the spin in which it first lands, a second-level aggregation symbol is locked in place and aggregates all value-bearing symbols below it during the spin in which it lands and any subsequent bonus spins.

The bonus game then proceeds through its remaining steps and spins as described above until the bonus spin counter is exhausted. When this is detected at step 1236, the game-logic circuitry awards all of the amounts displayed on any value-bearing bonus symbols in the array 230, including aggregation symbols, at step 1238. The bonus game has then reached a conclusion and the player may cashout at step 1240, concluding the method 1200 at step 1242, or place another base game wager at step 1208.

In this description, numerous specific details are set forth. However, it is understood that embodiments of the invention may be practiced without these specific details or with additional details or in various combinations. For example, as part of the aggregation/absorption sequence that removes absorbed value-bearing symbols from the array 1320 when their values have been aggregated into the value borne by an aggregation symbol, a multiplier, bonus credits or the like may be displayed on the individual reel at any array position that the value-bearing symbol passed in the animation of it being absorbed. In other embodiments, the value placed on the aggregation symbol may be enhanced based on the number of rows between the aggregation symbol and the value-bearing bonus symbol it absorbs. In still other embodiments, the longer the distance traveled by the aggregated value-bearing symbol, the greater the modifier(s) left behind. In other embodiments, the number of value-bearing bonus symbols aggregated in each column may be tracked and, as an example, a bonus spin may be awarded at step 1234 if a certain number of value-bearing bonus symbols, for example, three, have been absorbed in a single column. In other embodiments, the total number of absorbed symbols may be tracked, and bonus spins or other prizes may be awarded as certain threshold are met. Aggregation symbols may aggregate the values on value-bearing symbols in their column, in their row, or according to any aggregation rules specified for a particular level of aggregation symbol. Though two levels of aggregation symbol have been described, any number of levels may be employed.

In other instances, well-known circuits, structures, and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:

a presentation assembly configured to present a plurality of symbol positions selectively populated with symbols randomly, in response to data output from a random number generator, selected from one or more sets of available symbols for a game feature, the one or more sets of available symbols including one or more value-bearing symbols, each value-bearing symbol including award indicia visibly indicating a respective award associated with the value-bearing symbol; and game-logic circuitry in communication with the presentation assembly, the game-logic circuitry configured to:

communicate data that results in causing the presentation assembly to present a first game outcome for the game feature, the first game outcome including populating one or more symbol positions of the plurality of symbol positions with respective value-bearing symbols of the one or more value-bearing symbols;

communicate data that results in causing the presentation assembly to lock the respective value-bearing symbols in their symbol positions to remain in their symbol positions;

communicate data that results in causing the presentation assembly to present a second game outcome following the first game outcome, the second game outcome including an aggregation symbol occupying a first symbol position of the plurality of symbol positions not including the one or more symbol positions having respective value-bearing symbols locked therein;

in response to detecting the aggregation symbol, identifying one or more of the value-bearing symbols as being linked to the aggregation symbol based on a predetermined positional relationship between the first symbol position and each symbol position of the one or more symbol positions;

in response to identifying the one or more linked value-bearing symbols, cause the presentation assembly to provide award indicia on the aggregation symbol visibly indicating a respective award associated with the aggregation symbol, the respective award associated with the aggregation symbol being at least partially a function of the respective awards of the one or more linked value-bearing symbols; and communicate data that results in causing the presentation assembly to remove the one or more linked value-bearing symbols from the plurality of symbol positions;

wherein:

the aggregation symbol has a first aggregation symbol type or a second aggregation symbol type, the first aggregation symbol type remaining unlinked to any value-bearing symbols from subsequent game outcomes after the second game outcome, and the second aggregation symbol type linking the aggregation symbol to value-bearing symbols from subsequent game outcomes after the second game outcome based on the predetermined positional relationship.

2. The gaming machine of claim 1, wherein the plurality of symbol positions forms a symbol array having rows and columns of symbol positions, and wherein the predetermined positional relationship includes the symbol positions of the one or more linked value-bearing symbols sharing a row or a column of the symbol array with the first symbol position.

3. The gaming machine of claim 2, wherein the predetermined positional relationship further includes a predetermined direction along the row or the column relative from the first symbol position such that value-bearing symbols along a direction different from the predetermined direction remain unlinked to the aggregation symbol.

4. The gaming machine of claim 1, wherein the aggregation symbol type of the aggregation symbol is based at least in part on the first symbol position.

5. The gaming machine of claim 1, wherein each of the respective value-bearing symbols locked in their symbol positions is associated with a respective removal trigger, the removal trigger comprising at least one of the respective value-bearing symbols linking to an aggregation symbol or a predefined number of game outcomes expires.

6. The gaming machine of claim 5, wherein the predefined number of game outcomes is dynamically extended through extension trigger events occurring within the game feature.

7. A method of operating a casino gaming machine, the method comprising the operations of:

detecting, via a value input device, a physical item associated with a monetary value that establishes a credit balance;

presenting, by a presentation assembly, an array comprising a plurality of reels bearing a plurality of symbols, the plurality of symbols including at least standard symbols and value-bearing symbols;

receiving, via at least one of one or more electronic input devices, a wager input that initiates a spin of the plurality of reels;

conducting, by game-logic circuitry, the spin of the plurality of reels, the spin including spinning and stopping the plurality of reels to determine symbols from the plurality of symbols to populate the array;

paying any winning combinations of standard symbols among the symbols according to a pay table;

in response to a triggering event, initiating a bonus game comprising:

a) initializing a spin counter to a predetermined value;

b) locking all value-bearing symbols among symbols in the array in their positions;

c) spinning and stopping the plurality of reels to land new symbols from the plurality of symbols in all positions of the array not having a locked value-bearing symbol therein;

d) in response to at least one of new symbols including a first-level aggregation symbol, aggregating one or more values of a first subset of the one or more value-bearing symbols in the array into a value borne by the first-level aggregation symbol in the array according to a first set of aggregation rules;

e) in response to at least one of the new symbols including a second-level aggregation symbol, aggregating one or more values of a second subset of the one or more value-bearing symbol in the array into a value borne by the second-level aggregation symbol in the array according to a second set of aggregation rules, wherein: the second subset is different than the first subset and the second set of aggregation rules are different than the first set of aggregation rules;

f) decrementing the spin counter;

g) repeating steps (b) through (f) until no spins remain on the spin counter; and h) paying an award based on the values borne by all symbols in the array; and receiving, via at least one of one or more electronic input devices, a cash out input that initiates a payout from the credit balance via a value output device.

8. The method of claim 7, wherein values borne by the value-bearing symbols are randomly assigned.

9. The method of claim 7, further comprising randomly assigning a value to at least one of the new symbols after the at least one new symbol lands in the array.

10. The method of claim 7, further comprising designating at least one of the new symbols as the first-level aggregation symbol or the second-level aggregation symbol after the at least one new symbol lands in the array.

11. The method of claim 7, wherein the first set of aggregation rules only apply during a spin in which the first-level aggregation symbol lands in the array.

12. The method of claim 7, wherein at least one of the first or second sets of aggregation rules comprises limiting the rows of the array from which a value-bearing symbol may be aggregated into either the first-level aggregation symbol or the second-level aggregation symbol.

13. The method of claim 7, wherein at least one of the first or second sets of aggregation rules comprises limiting the columns of the array from a value-bearing symbol may be aggregated into either the first-level aggregation symbol or the second-level aggregation symbol.

14. The method of claim 7, wherein at least one of the first or second sets of aggregation rules comprises removing a value-bearing symbol from the array once its value has been aggregated into at least one of the first-level or second-level aggregation symbols.

15. The method of claim 7, wherein the first set of aggregation rules comprise adding the value borne by any value-bearing symbol in the array in a row on a specified side of the row occupied by the first-level aggregation symbol.

16. The method of claim 7, further comprising adding one or more additional rows to the array upon occurrence of the triggering event.

17. The method of claim 16, further comprising locking at least one of the one or more additional rows until unlocked by the occurrence of a second triggering event.

18. The method of claim 17, wherein the first and second sets of aggregation rules only apply to first-level and second-level aggregation symbols landing in unlocked rows of the array.

19. The method of claim 7, further comprising adjusting the spin counter based, at least in part, on the aggregation of one or more value-bearing symbols into at least one of the first-level or second-level aggregation symbols.

20. The method of claim 7, wherein the values borne by the value-bearing symbols are randomly assigned to the symbols upon their landing in the array.

21. The method of claim 7, further comprising animating, via the presentation assembly, the aggregation of the value-bearings symbols into the first-level and second-level aggregation symbols.

* * * * *